United States Patent
Figg

(10) Patent No.: US 9,947,017 B2
(45) Date of Patent: Apr. 17, 2018

(54) ONLINE CONTENT CAMPAIGN CLASSIFICATION

(75) Inventor: Matthew Figg, Adelaide (AU)

(73) Assignee: ACCENTURE GLOBAL SERVICES LIMITED, Dublin (IE)

(*) Notice: Subject to any disclaimer, the term of this patent is extended or adjusted under 35 U.S.C. 154(b) by 1383 days.

(21) Appl. No.: 13/455,885

(22) Filed: Apr. 25, 2012

(65) Prior Publication Data

US 2012/0209728 A1    Aug. 16, 2012

Related U.S. Application Data

(63) Continuation-in-part of application No. 12/396,645, filed on Mar. 3, 2009, now Pat. No. 8,386,314.

(51) Int. Cl.
*G06Q 30/02* (2012.01)
*G06Q 10/10* (2012.01)

(52) U.S. Cl.
CPC ............ *G06Q 30/02* (2013.01); *G06Q 10/10* (2013.01)

(58) Field of Classification Search
CPC ...................................................... G06Q 30/02
USPC ............................................................ 705/14
See application file for complete search history.

(56) References Cited

U.S. PATENT DOCUMENTS

| | | |
|---|---|---|
| 6,981,224 B1 | 12/2005 | Gardner et al. |
| 2002/0004733 A1 | 1/2002 | Addante |
| 2002/0099695 A1 | 7/2002 | Abajian et al. |
| 2004/0078294 A1 | 4/2004 | Rollins et al. |
| 2004/0098493 A1 | 5/2004 | Rees |
| 2004/0133471 A1 | 7/2004 | Pisaris-Henderson |
| 2004/0227768 A1 | 11/2004 | Bates et al. |
| 2005/0021397 A1 | 1/2005 | Cui et al. |
| 2005/0021862 A1 | 1/2005 | Schroeder et al. |
| 2005/0055275 A1 | 3/2005 | Newman et al. |
| 2005/0137939 A1 | 6/2005 | Calabria et al. |
| 2005/0209919 A1 | 9/2005 | Stubbs et al. |
| 2006/0253583 A1 | 11/2006 | Dixon et al. |
| 2007/0112960 A1 | 5/2007 | Joy et al. |
| 2007/0282829 A1 | 12/2007 | Fontoura et al. |
| 2007/0294401 A1 | 12/2007 | Shkedi |
| 2008/0065630 A1 | 3/2008 | Luo et al. |
| 2008/0086368 A1 | 4/2008 | Bauman et al. |
| 2008/0114624 A1 | 5/2008 | Kitts |
| 2008/0140502 A1 | 6/2008 | Birnholz et al. |

(Continued)

FOREIGN PATENT DOCUMENTS

| | | |
|---|---|---|
| CN | 102033881 | 4/2011 |
| CN | 102591983 | 7/2012 |

(Continued)

OTHER PUBLICATIONS

M86 Secure Web Gateway v 10.1 by Lipinski, Mike; SC Magazine vol. 23 issue 3 p. 41; Mar. 2012. (Year: 2012).*

(Continued)

*Primary Examiner* — Eric R Netzloff
*Assistant Examiner* — Michael R Stibley
(74) *Attorney, Agent, or Firm* — Mannava & Kang, P.C.

(57) ABSTRACT

A content evaluation system includes a scanning server to scan web sites to determine metrics for online ads. The content evaluation system may include a content evaluation server to classify the online ads into campaign groups based on the metrics, and each group is associated with a different ad campaign.

18 Claims, 14 Drawing Sheets

(56) References Cited

U.S. PATENT DOCUMENTS

| | | | |
|---|---|---|---|
| 2008/0201733 A1 | 8/2008 | Ertugrul et al. | |
| 2008/0250446 A1 | 10/2008 | Zigmond et al. | |
| 2008/0270363 A1 | 10/2008 | Hunt et al. | |
| 2008/0301574 A1 | 12/2008 | Sanghvi et al. | |
| 2009/0197582 A1 | 8/2009 | Lewis et al. | |
| 2009/0257620 A1 | 10/2009 | Hicks | |
| 2009/0284530 A1* | 11/2009 | Lester | G06Q 30/02 345/440 |
| 2009/0307081 A1* | 12/2009 | Rabbitt | G06Q 30/02 705/14.42 |
| 2010/0076954 A1 | 3/2010 | Dulitz et al. | |
| 2010/0153217 A1 | 6/2010 | Kirkby et al. | |
| 2010/0235219 A1 | 9/2010 | Merrick et al. | |
| 2010/0241498 A1 | 9/2010 | Chung et al. | |
| 2010/0257022 A1 | 10/2010 | Wang et al. | |
| 2011/0035273 A1 | 2/2011 | Parikh et al. | |
| 2011/0125587 A1 | 5/2011 | Netzer et al. | |
| 2012/0173552 A1 | 7/2012 | Zhu et al. | |

FOREIGN PATENT DOCUMENTS

| | | |
|---|---|---|
| EP | 2270736 | 1/2011 |
| JP | 2001188703 | 7/2001 |
| JP | 2002049553 | 2/2002 |
| JP | 2008269045 | 11/2008 |
| KR | 20080000810 | 1/2008 |
| KR | 20080048790 | 6/2008 |
| WO | 2008/002031 | 1/2008 |

OTHER PUBLICATIONS

"Patent Examination Report No. 1" on Australia Patent Application No. 2013205416, dated May 9, 2014, 5 pages.
"Patent Examination Report No. 1" on Australia Patent Application No. 2013221949, IP Australia, dated May 23, 2014, 6 pages.
Tess Trademark Search of Flash, downloaded on Nov. 13, 2015, 3 pages.
Tess Trademark Search of Java, downloaded on Nov. 13, 2015, 2 pages.
Duriau, Vincent J., et al., "A Content Analysis of the Content Analysis Literature in Organization Studies: Research Themes, Data Sources, and Methodological Refinements", pp. 5-34, Jan. 2007.
Chen, Rui, et al., "CINDI Robot: an Intelligent Web Crawler Based on Multi-level Inspection", Database Engineering and Applications Symposium, 2007, Ideas 2007, 11th International, IEEE, Piscataway, NJ, USA, Sep. 1, 2007, pp. 93-101, XP025080344.
Bun, Khoo Khyou, et al., "Emerging topic tracking system in WWW", Knowledge-based systems, Elsevier, vol. 19, No. 3, Jul. 1, 2006, pp. 164-171, XP025080344.
Martins, Bruno, et al., "The WebCAT Framework Automatic Generation of Meta-Data for Web Resources", Web Intelligence, 2005, Proceedings, the 2005 IEEE/WIC/ACM International AL Conference on COMPIEGNE, France Sep. 19-22, 2005, pp. 236-242, XP010841644.
Krammer, Viktor, "An Effective Defense against Intrusive Web Advertising", Privacy, Security, and Trust, 2008, PST '08, Sixth Annual Conference on, IEEE, Piscataway, NJ, USA, Oct. 1, 2008, pp. 3-14.
"Parse JavaScript links in HTML", IBM corp., IP.com Inc, West Henrietta, NY, US, Sep. 24, 2003.
Brin, Sergey, et al., "The anatomy of a large-scale hypertextual Web search engine", Computer Networks and ISDN Systems, North Hollan Publishing, Amsterdam, NL, vo. 30, No. 1-7, Apr. 1, 1998, pp. 107-117.
"European Search Report", European Application No. 09012209.4, European Patent Office, dated Mar. 24, 2010.
"Notice of Reasons for Refusal" Japanese Application No. 2009-281229, Japanese Patent Office, dated Dec. 17, 2013.

* cited by examiner

FIG. 5C

All Campaigns for Client A
KPIs for Quarter 4, 2009

| | Cost | Pool | Vs Pool | Weight | Value |
|---|---|---|---|---|---|
| Cost | | | | | |
| CPM Buys | $0.00 | $4,900,000.00 | 100.00% | | -$4,900,000.00 |
| Fixed / Tenancy Buys | $0.00 | $130,000.00 | 100.00% | | -$130,000.00 |
| CPC Buys | $0.00 | | | | |
| CPA Buys | $0.00 | | | | |
| Ad Serving | $0.00 | $400,000.00 | 100.00% | | $400,000.00 |
| Cost Total | $0.00 | $5,430,000.00 | 100.00% | | -$5,430,000.00 |

| | Performance | Pool | Vs Pool | Weight | Value |
|---|---|---|---|---|---|
| Coverage | | | | | |
| % of Pages Covered | 1.61% | 15.00% | -13.39% | | $0.00 |
| Distance from Home Page | 1.44% | 15.50% | -14.05% | | $0.00 |
| Searchability | 1.51% | 15.31% | -13.81% | | $0.00 |
| Distance / Searchability | 1.69% | 14.83% | -13.14% | 12 | $0.00 |
| Reach | | | | 12 | |
| Targeting | | | | | |
| Demographic Affinity | | | | 17 | |
| Context Relevance | | | | | |
| Attention | | | | | |
| Page Dominance Ad Space | 13.27% | 29.15% | -15.88% | 20 | $0.00 |
| Page Viewing Time | | | | 20 | |
| Delivery over time | | | | | |
| Cache Busting | 97.44% | 81.92% | 15.53% | 50 | $0.00 |
| Click Through Works | 99.12% | 90.13% | 9.00% | 10 | $0.00 |
| Not Transmitted | 93.56% | 67.40% | 26.16% | 100 | $0.00 |
| Quality Total | | | | | $0.00 |
| TOTAL VALUE | | | | | -$5,430,000.00 |

ONLINE CONTENT CAMPAIGN CLASSIFICATION

PRIORITY

This application is a continuation-in-part of U.S. patent application Ser. No. 12/396,645, filed Mar. 3, 2009, and entitled "Online Ad Detection and Ad Campaign Analysis", which is incorporated by reference in its entirety.

BACKGROUND

Online advertising typically includes posting advertisements (ads) on the Internet. The online ads may include a marketing message, and a user may be able to click on the ad, which typically takes the user to another web page for a product or service being marketed in the ad. Online ads may be provided in many forms, such as text ads, image ads, banner ads, etc. A banner ad is an ad embedded in a web page and often includes text, images, video, sound or any combination of those elements.

Ads are usually purchased from an ad service or an ad network, referred to as ad vendors herein, in order to have the ad placed on a particular web site. For example, search engines typically offer ad services whereby an advertiser pays to have their ads posted on the search engine web site or other affiliated web sites. Many web sites, in addition to search engines, offer similar services for posting online ads for companies or other entities.

In many instances, the online ads are required to be posted for a certain period of time and are required to be posted in certain locations on a web site or may be required to be posted in response to certain conditions being met. Many entities engage in sophisticated online advertising campaigns where they are competing against competitors for ad space and they are placing many ads across many web sites. It is difficult to track the web sites to determine whether the web sites are posting their ads, and whether the ads include the proper content and are provided in the proper web page and in the proper location on the web page.

SUMMARY

According to an embodiment, an online content evaluation system includes a scanning server to scan web sites and to collect metrics for online ads. The scanning may include parsing web pages for the web sites, identifying ad beacons from the parsed web pages, determining whether the ad beacons include information identifying the online ads as online ads for a predetermined company, and determining the metrics for the online ads identified as online ads for the predetermined company. An online content evaluation server classifies online ads. The classifying may include classifying the online ads into candidate groups based on the metrics, wherein, for each candidate group, the online ads classified into the candidate group are estimated to be in a same ad campaign. A group merging process may be executed to merge at least some of the candidate groups and to determine campaign groups at: least from the merged groups, and an ad campaign is assigned to each campaign group.

An online content evaluation computer system may include a data storage storing online ad information, wherein the online ad information comprises metrics for online ads determined from scanning web sites on the Internet. A processor may classify the online ads into candidate groups based on the online ad information, wherein, for each candidate group, the online ads classified into the candidate group are estimated to be in a same ad campaign. The processor may merge at least some of the candidate groups and determine campaign groups from the merged groups. An ad campaign assigned to a campaign group.

A method of evaluating online content may include classifying online ads into candidate groups based on online ad information, executing a group merging process to merge candidate groups and to determine campaign groups from the merged groups, and assigning an ad campaign to each group. The method may be performed by a computer processor executing machine readable instructions stored on a non-transitory computer readable medium.

BRIEF DESCRIPTION OF DRAWINGS

The embodiments of the invention will be described in detail in the following description with reference to the following figures.

FIGS. 5A-C illustrates examples of reports, according to embodiments;

FIG. 9 illustrates a chart illustrating reducing candidate campaign group comparisons, according to an embodiment;

DETAILED DESCRIPTION OF EMBODIMENTS

Figure 1:
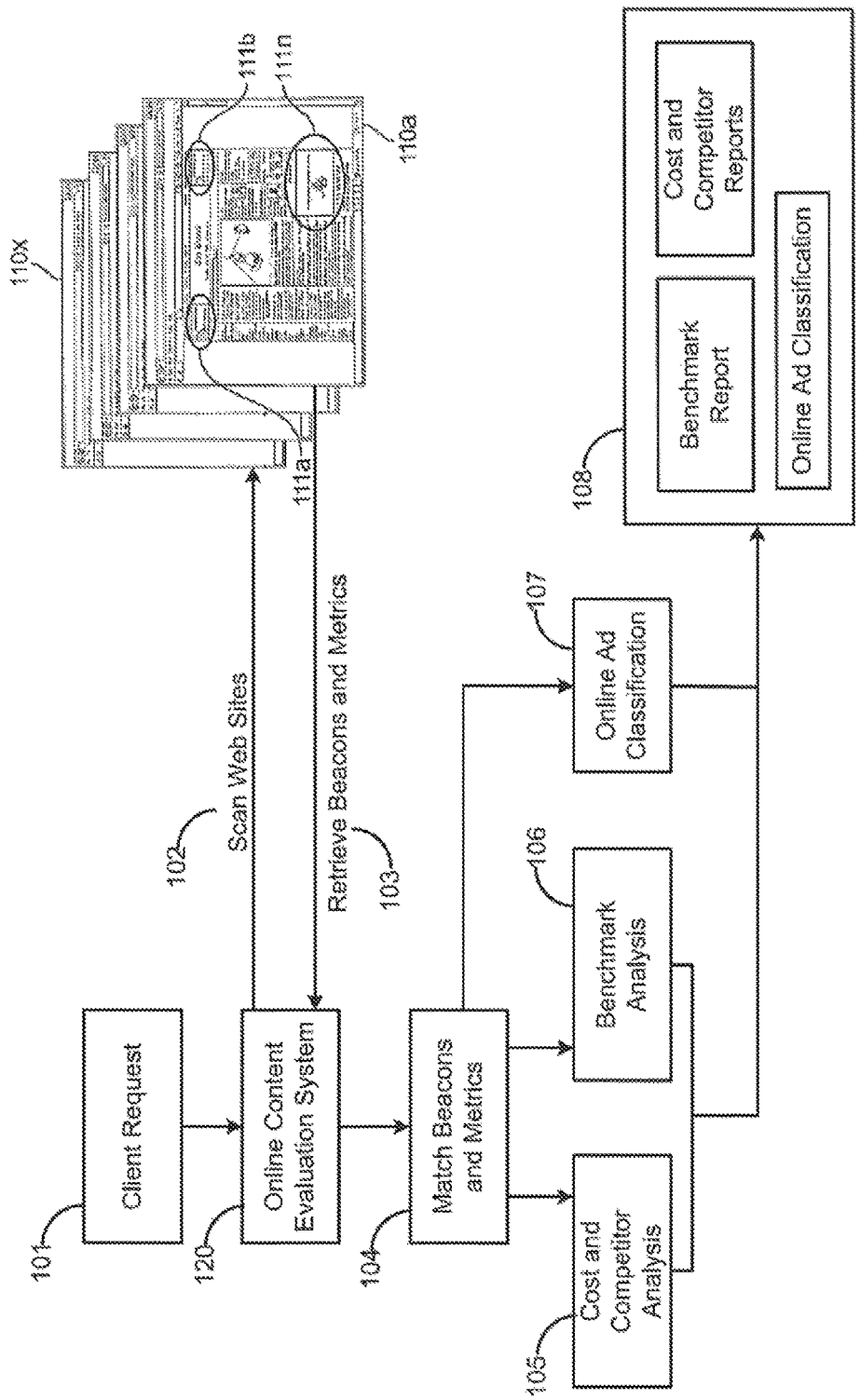
FIG. 1 illustrates a data flow diagram for a system, according to an embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

According to an embodiment, an online content evaluation system is configured to detect and identify online ads, and provide an audit service for the online ads. An online ad is a message provided on a web site. The message in the ad is typically a marketing message promoting products or services, which may be offered for sale. Many online ads can be clicked'on by a user, which may take the user to the product web site or another web site promoting the product or service. Online ads may be provided in many forms, such as banner ads, pop-up ads, floating ads, etc.

Technical problems for which the embodiments provide technical solutions include how to capture information from the Internet related to online ads or other online content. Also, once this information is captured, a technical problem is how to derive classification information from the captured information, which may be used to classify the online ads into predetermined categories which may include different ad campaigns. An ad campaign is a series of advertisement messages (e.g., online ads) that share a single idea and theme which make up an integrated marketing communication. Different online ads may be part of the same ad campaign. An ad campaign may be for a specific time period, such as three months, six months, etc. According to an embodiment, the online content evaluation system is operable to perform online ad classification based on information derived from scanning the Internet for online ads. The classification may include classifying the online ads into different ad campaigns, so an overall evaluation of an online ad campaign can be performed.

The online content evaluation system is able to scan and detect online ads. In one embodiment, a scan server cloud is used to scan web sites dispersed over a wide geographic area. The scanning may be performed for a predetermined set of web sites, which are identified by a client, or for a much larger group of web sites, or for both a predetermined set and for a much larger group of web sites.

The online content evaluation system is able to determine metrics for online ads from the scanning. These metrics may also be key performance indicators (KPIs) or can be used to derive KPIs for auditing and competitor analysis. Categories of metrics and KPIs for online ads include but are not limited ad coverage, targeting, delivery quality, and cost. Coverage is associated with locations of a client's online ads and may be compared with a competitor's online ad coverage. Targeting is associated with whether the online ads are posted in locations lucrative to the ad or posted in predetermined locations. This may be web sites where purchasers of goods being advertised frequently access. Delivery quality is associated with the content of the online ads, and cost is associated with cost of having an online ad posted.

The metrics captured by online content evaluation system may be used by a client, such as an ad buyer, to audit information about their ads posted on web sites. A client is a user having online ads. The user may be a person, company, or other entity. The client may request metrics be captured for their online ads and/or competitors' online ads. Examples of these metrics include: when the ad was presented (e.g., date and time); ad image (e.g., the actual image presented in the ad); frequency of the occurrence of an ad image in the scan (e.g., two occurrences in 3 scans) based on scan scheduling; hourly/daily detection of the image; where a page including the ad was presented (e.g., uniform resource locator (URL) and page title); a site level hierarchy identifying where the page including the ad is located in the web site; ad location in the web page (e.g., function of the tile parameter being set by DOUBLECLICK); click through verification (e.g., checking to make sure the click through works); inappropriate content verifier (make sure ad does not appear next to inappropriate content or text); and ad matching, which includes checking to see which ads are shown with other ads (e.g., is your competitor's ad being shown at the same time as your ad). Reports are generated for the client summarizing this information.

The metrics used for the audit service can be combined to derive one or more ad presence KPIs or other types of KPIs. For example, content proximity KPIs may be derived from the proximity of the client's ads to competitors' ads and from the proximity of the client's ads to in appropriate content. Cost analysis KPIs may be used to determine ad effectiveness versus cost. For example, the cost for clicked ads is compared to ads ignored to derive a KPI for ad effectiveness versus cost. A KPI related to cost per page versus site level may be determined from the location of an ad in a web page hierarchy and the cost of that ad. A depth versus breadth scan analysis may be performed to determine the most effective ads. A cost of proximity to potential negative influences (e.g. competitor ads, inappropriate content) may be determined. This may include determining the effectiveness of ads. Effectiveness may also be measured based on the cost of ad placement in a web site and where the ad is actually placed versus the planned or desired placement.

In addition to tracking online advertisements, online content evaluation system provides an ad campaign analysis that includes competitor and benchmarking analysis. An ad campaign may include multiple ads placed on multiple web pages for a particular client. The ad campaign analysis identifies metrics for competitor's ads to determine who is advertising where and how often they are advertising. This information may be compared to the ad information for the client to determine where the client may additionally need to advertise or where the client may have too much advertising coverage.

For example, coverage, targeting and delivery metrics are used to determine whether a competitor is likely having better ad placement. For example, company A is a client (e.g., a user of the online content evaluation system services). Company A is selling luxury sports cars. A web site widely popular with owners of luxury sports cars has ads for Company A. The web site has a hierarchy of web pages starting at the home page. online content evaluation system determines that company A's competitor has an online ad on the home page, and that Company A's online ad is on a web page farther down in the hierarchy. online content evaluation system also determines that company A's online ad is located in a bottom right corner of the web page, while another competitor's ad is located in the center, right side of the web page. Based on this analysis, company A may purchase an online ad on the home page in a location more likely to be viewed and accessed by a visitor to the web site. A cost analysis may also be performed. This may include an analysis of cost for clicked ad versus ignored ads per site.

Both the ad campaign analysis and audit service use the ad information captured during the ad scan phase performed by scan servers. An online content evaluation system server running software provides the ad campaign analysis and audit services, and the user interface. Also, online content evaluation system provides a user interface, for example, via a web page, that allows clients or other users to view reports, metrics, key performance indicators (KPIs), and other information. For example, a user can login to the online content evaluation system web page to get audit reports specifying the metrics and KPIs for the audit service. Competitor ad benchmarking analysis and other reports may also be viewed and downloaded via the web page user interface.

FIG. 1 illustrates a high-level data flow diagram for the online content evaluation system 120. The online content evaluation system 120 receives a client request at 101. The client request may include a list of all the web sites in which the client's ads are supposed to be posted. The client request may also include the type of analysis desired. For example, the client may be interested in a competitor analysis, a cost analysis, or a benchmarking analysis. The competitor analysis evaluates the client's ad campaign relative to a predetermined set of competitors based on the metrics. The cost analysis evaluates the client's ad campaign effectiveness versus cost. The benchmark analysis may analyze the presence of the client's ads, such as whether they are delivered, whether the ads are in the proper page location and have the proper content, frequency of occurrence, such as number of ads posted on the web page or web site, uniqueness of images in ads, and trends.

At 102, the online content evaluation system 120 scans the Internet to capture metrics for the client's ad campaign. The scan may cover the set of web sites provided by the client or a larger search space. FIG. 1 shows web pages 110a-x, including ads 111a-n.

At 103, the online content evaluation system 120 retrieves a beacon for each ad and metrics for each ad. A beacon, also referred to as a web beacon, is code for a web page that is able to retrieve information from another server. For ads, the beacon retrieves an ad image. The beacon may be a unique identifier or include a unique identifier for the ad or client. The beacon may be coded in hypertext markup language (HTML), Java script, Flash, etc., and is identifiable by parsing the code of a web page.

At 104, the online content evaluation system 120 matches the beacons to stored beacons for the client, and stores metrics for any matches in a database. The effectiveness of the ad campaign can be determined from the metrics. For example, at 105 and 106, an ad campaign analysis is performed that may include a competitor analysis, a cost analysis, and/or a benchmarking analysis. At 108, reports are generated for the campaign analysis.

At 107, online ad classification is performed. For example, based on the matched beacons and captured metrics, the online ads may be classified into corresponding ad campaigns. The reports at 108 may include indications of groupings of online ads into their ad campaigns.

Figure 2:
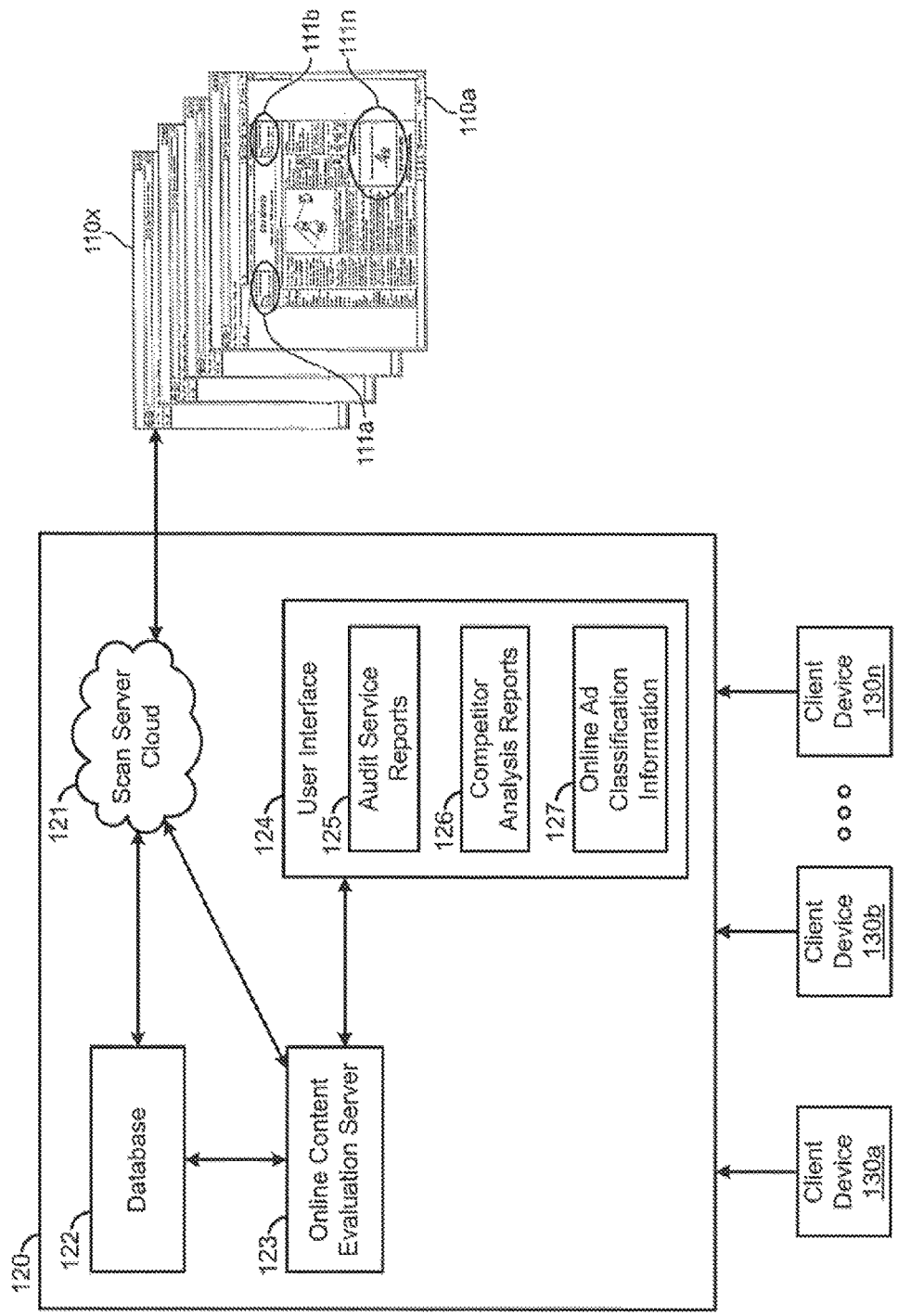
FIG. 2 illustrates a system diagram, according to an embodiment.

FIG. 2 illustrates a more detailed block diagram of online content evaluation system 120. The online content evaluation system 120 includes a scan server cloud 121, a database 122, and online content evaluation system server 123. The scan server cloud 121 includes multiple scan servers placed at different locations around the world to provide scalable website scanning and analysis. Each scan server scans a specific set of websites. For example, one scan server in the cloud 121 may be responsible for scanning web pages 110a-x which are geographically hosted near the scan server. Other servers scans other geographic areas. Together the server cloud covers all sites requested by the client for analysis. The database 122 stores banners, beacons, website structure data, ad metrics and any other information received from the scanning performed by the scan server cloud 121. The database 122 or another database stores client information, so the ad information determined from the scanning can be matched to the client information. For example, a client may be a car manufacturer. The database 122 stores a client ID for the car manufacturer, and information about their ads, such as beacons, so the retrieved beacons for scanned ads can be matched with the client's ads.

The online content evaluation system server 123 receives and compiles the scanned ad information. This includes matching the scanned ad information and client information stored in the database 123. The matching associates the scanned ad information to the corresponding client. The online content evaluation system server 123 also uses the scanned information to classify online ads into ad campaigns. The online content evaluation system server 123 also pre-calculates summary statistics and KPIs from gathered metrics to increase software responsiveness with large volumes of scan data. For example, the online content evaluation system server 123 may determine KPIs for many clients and multiple clients may simultaneously require reporting. The online content evaluation system server 123 may summarize metrics and KPIs prior to the client requesting the information. The KPIs, metrics and summaries may be stored in the database 122.

The online content evaluation system server 123 also generates reports, including KPIs, which determine the effectiveness of ads relative to the content and web site. These reports are compiled from the attributes and metrics for the client's ads captured during the scan performed by the scan server cloud 121. This is shown as the audit service reports 125. The online content evaluation system server 123 also generates competitor analysis reports 126. The ad campaign analysis identifies metrics for competitor's ads to generate the reports 126 of benchmarking statistics identifying which competitors are advertising and where and how often they are advertising.

A user interface 124 is also provided for presenting users or clients with the attributes, metrics, KPIs and reports generated by the online content evaluation system server 123. The user interface 124 may be a graphical user interface (GUI) that allows users to dynamically search their advertising statistics and selects KPIs and reports for viewing. The user interface 124 may be provided through a web page, where the user can login and view the desired information. In addition to viewing reports, users may interact with the online content evaluation system 120 to view or provide different information, including ad campaign classification information, websites for scanning, etc. Client devices 130a-n, such as laptops, desktops, cellular phones, etc., may be connected, e.g., via a network, to the online evaluation system 120 to interact with the system for example via the user interface 124.

Figure 3:
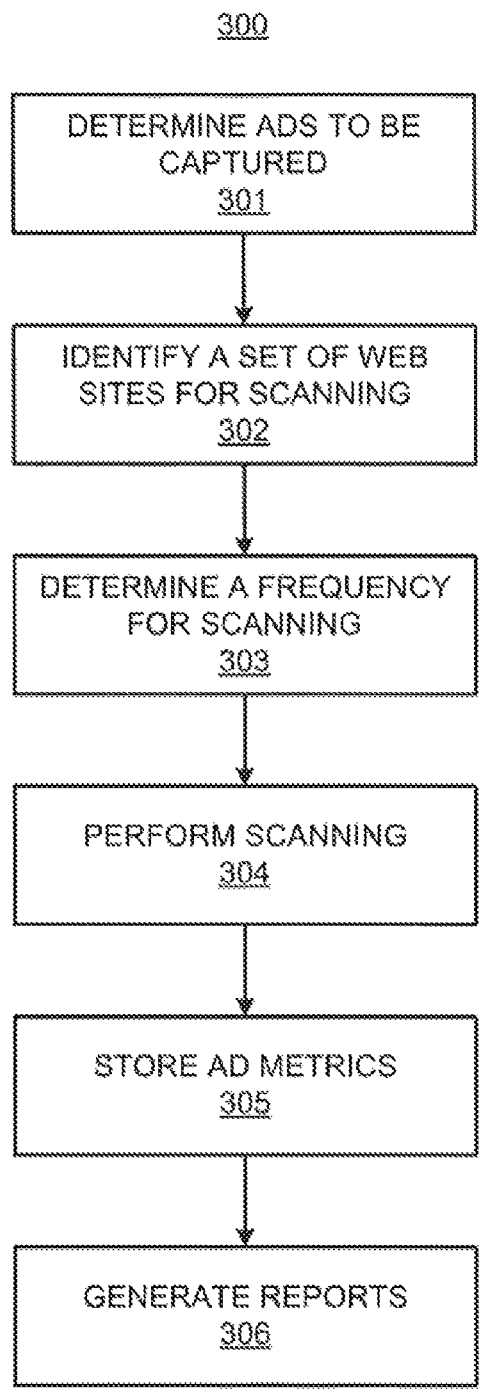
FIG. 3 illustrates a flow chart for scanning and report generation, according to an embodiment.

FIG. 3 illustrates a flow chart of a method 300 for scanning web pages for ad information. The scan servers in the scan server cloud 121 shown in FIG. 2 may use this method to perform the scanning.

At step 301, ads to be captured by the scanning are determined. For example, a client may be a single company that needs to determine whether and where their ads are being posted. Thus, metrics for ads for the company are captured. In another example, the company may want ads for a particular product captured. Thus, metrics for ads for that particular product are captured. In another example, a client is an advertising vendor that provides a service of placing ads for its clients on several web sites. The advertising vendor identifies the ads for its clients to be captured by the scanning. In yet another example, a client may want ads for its competitors' captured. Then, a list of the competitors are provided by the client, and metrics for the competitors' ads are captured. In one embodiment, beacon IDs are determined for the clients which, identify the ads to be captured during the scanning.

At step 302, a set of web sites are identified for scanning. A client may provide a list of web sites to be scanned. These may include web sites that are supposed to be posting the client's ads based on agreements (e.g., agreements between ad vendors and web site owners). Also, the client may provide a list of web sites that may be posting competitors' ads for the competitor analysis. Also, instead of using lists of web sites provided by the client or in addition to using the lists, a region-based or a more global-based scan can be performed.

At step 303, a frequency for scanning is determined. The scan frequency or interval may be determined to match the client's needs. For example, one client may require scans at short intervals, such as every 10 minutes for one hour, and repeated twice daily. This type of scan interval will capture a large sample set of all banner ads in web sites being scanned. Another client may not need short interval scans. For example, one or two scans daily may be performed to determine ad audit information. The scan server cloud 121 shown in FIG. 2 provides the flexibility to modify scan frequencies and areas or web sites to be scanned. The scan server cloud 121 is configured to receive requested scan frequencies and web site lists or scan regions for a client and retrieve ad information from the scans.

At step 304, scanning is performed, and at step 305 ad metrics are captured and stored. The scanning is performed for the web sites identified at step 302, and at the intervals determined at step 303. The ad metrics captured by the scanning are stored in the database 122 shown in FIG. 2. The stored ad metrics include information for the ads identified at step 301.

The metrics captured by the scanning may be related to coverage, targeting, delivery, quality, and cost. Examples of these metrics include: when the ad was presented (e.g., date and time); ad image (e.g., the actual image presented in the ad); frequency of the occurrence of an ad image in the scan (e.g., two occurrences in 3 scans) based on scan scheduling; hourly/daily detection of the image; where a page including the ad was presented (e.g., URL and page title); a site level hierarchy identifying where the page including the ad is located in the web site; ad location in the web page (e.g., function of the tile parameter being set by DOUBLE-CLICK); click through verification (e.g., checking to make sure the click through works); inappropriate content verifier (make sure ad does not appear next to inappropriate content); and ad matching, which includes checking to see what ads are shown with others (e.g., is your competitor's ad being shown at the same time as your ad).

KPIs are also derived from the metrics. These KPIs may also be related to coverage, targeting, delivery, quality, and cost. Other metrics and KPIs, which may be beneficial for audit and competitor analysis, may also be captured and determined.

At step 306, reports are generated, for example, by the online content evaluation system server 123 shown in FIG. 2. The reports may be provided via the user interface 124 provided by online content evaluation system. The reports may include audit and competitor analysis reports derived from the metrics and KPIs. Audit reports provide an analysis of whether the client's ads are being posted and whether the ads are being posted in compliance with predetermined rules, which may be set forth in agreements between ad vendors and the client. An audit report may identify where the ad is posted on a web page or which web page within a web site is posting the ad or whether the ad is being posted next to inappropriate content or a competitor's ad.

The reports may also include competitor analysis, such as the web site and web page within a web site hierarchy where a competitor's ad is posted, the number of ads identified, and other information that is useful for benchmarking the client's ad coverage in relation to the competitor's ad coverage. Examples of reports are provided in FIGS. 5A-C.

Figure 4:
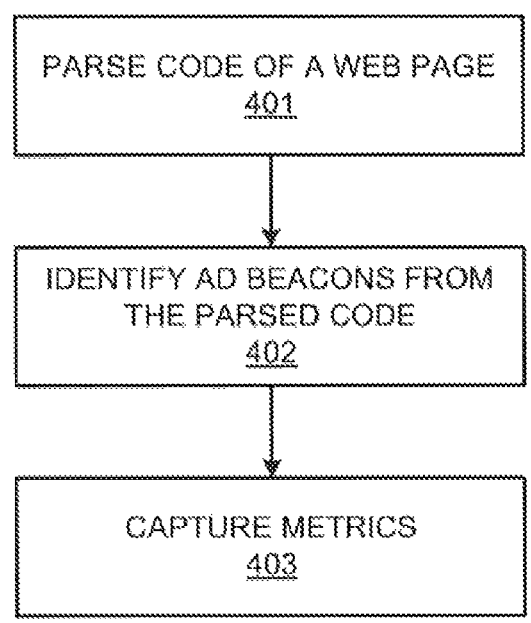
FIG. 4 illustrates a flow chart for scanning, according to an embodiment.

FIG. 4 illustrates a method 400 for scanning web sites for ads to capture ad metrics, according to another embodiment. The method 400 may be performed by online content evaluation system 120 shown in FIG. 2. The method 400 may also be performed by other systems. Also, the method 400 describes scanning a single web page. However, the same scan process is performed for all the web pages that are scanned to capture ad metrics for many web sites. Furthermore, the method 400 describes steps that may be performed at step 304 for the method 300.

At step 401, a scan server parses code of a web page. The scan server, for example, is a server in the scan server cloud 121 shown in FIG. 2. Scanning includes scanning the HTML, any Java scripts, FLASH or other web page code. Iframes are also scanned. Iframes are embedded HTML documents in a web page. Iframes are scanned recursively if an Iframe contains another Iframe. The HTML and Java script are parsed for each Iframe. Parsing includes identifying any code that may be a beacon or ad image. This may including identifying individuals segments of code, such as HTML tags or Java scripts that may potentially include a beacon or an ad image or include a link to an ad. As described above, a beacon, also referred to as a web beacon, is code for a web page that is able to retrieve information from another server. For ads, the beacon may retrieve an ad image.

At step 402, the scan server identifies ad beacons from the parsed code. Regular expression matching against known uniform resource locator (URL) formats used by advertising vendors (e.g., DOUBLECLICK, GOOGLE ADWORDS, etc.) may be used to identify ad beacons.

A beacon may include a regular image expression and a portion of the expression that is unique to the client is identified. For example, a client may use an ad vendor, such as DOUBLECLICK, to post their ads on web sites. The ad vendor puts a beacon in the web site to post the ad. The beacon includes a URL, such as http://m.uk.2mdn.net/viewad/766466/picname300×250.gif_120908.gif. 766466 is a unique identifier of the client's ad campaign assigned by the ad vendor and posted in all the beacons for the client. This unique identifier may be pre-determined and stored and associated with the client, for example, in a database, prior to the scanning of the web site. Regular expression matching is used to identify 766466 in the parsed code to find ads for the client. Thus, a portion of a URL in a beacon that identifies the client may be used for matching.

A beacon may include a click thru URL. In this case, the scan server follows and downloads the link in the URL, and continues to follow/download all redirects until a URL is found that doesn't match a beacon regular expression or a click thru URL. This is generally the raw URL of the advertiser's or client's website. The raw URL is stored as the click thru. Also, the matching of advertising images to their corresponding click thru beacon differs based on how the web site has decided to implement their advertising. For example, a click thru beacon may be in code structured as follows:

```
<a href="the click thru url">
<img src="the creative image">
</a>
```

In this case, the matching of the creative image to the click thru url is done based on the structure of the HTML. That is, the beacon is identified by identifying HTML in the web page having this structure, and the ad image is then identified.

In another example, a beacon may be provided in flash code, such as <embedsrc="http://ds.serving-sys.com/. . . flash.swf?" flashvars=" . . . "/>. In this case, the flash object is parsed and any links generated by the flash are stored.

Most web sites rely on Java script and Flash to deliver ads. Regular expression matching can be used to identify ad images and in particular ad images for the client.

Also, ad beacons are identified for the client as well as for the client's competitors. For example, if a portion of a URL identifies a competitor's name or if a competitors ID used by the ad vendor is known, then those ads are captured by the scan server and used for competitor analysis.

At step 403, metrics for an ad identified from its beacon are captured. The metrics may be determined by identifying the web page posting the ad, determining the hierarchy of the web site, and determining other metrics, for example, from code for the ad.

Figure 5A:
Figure 5B:
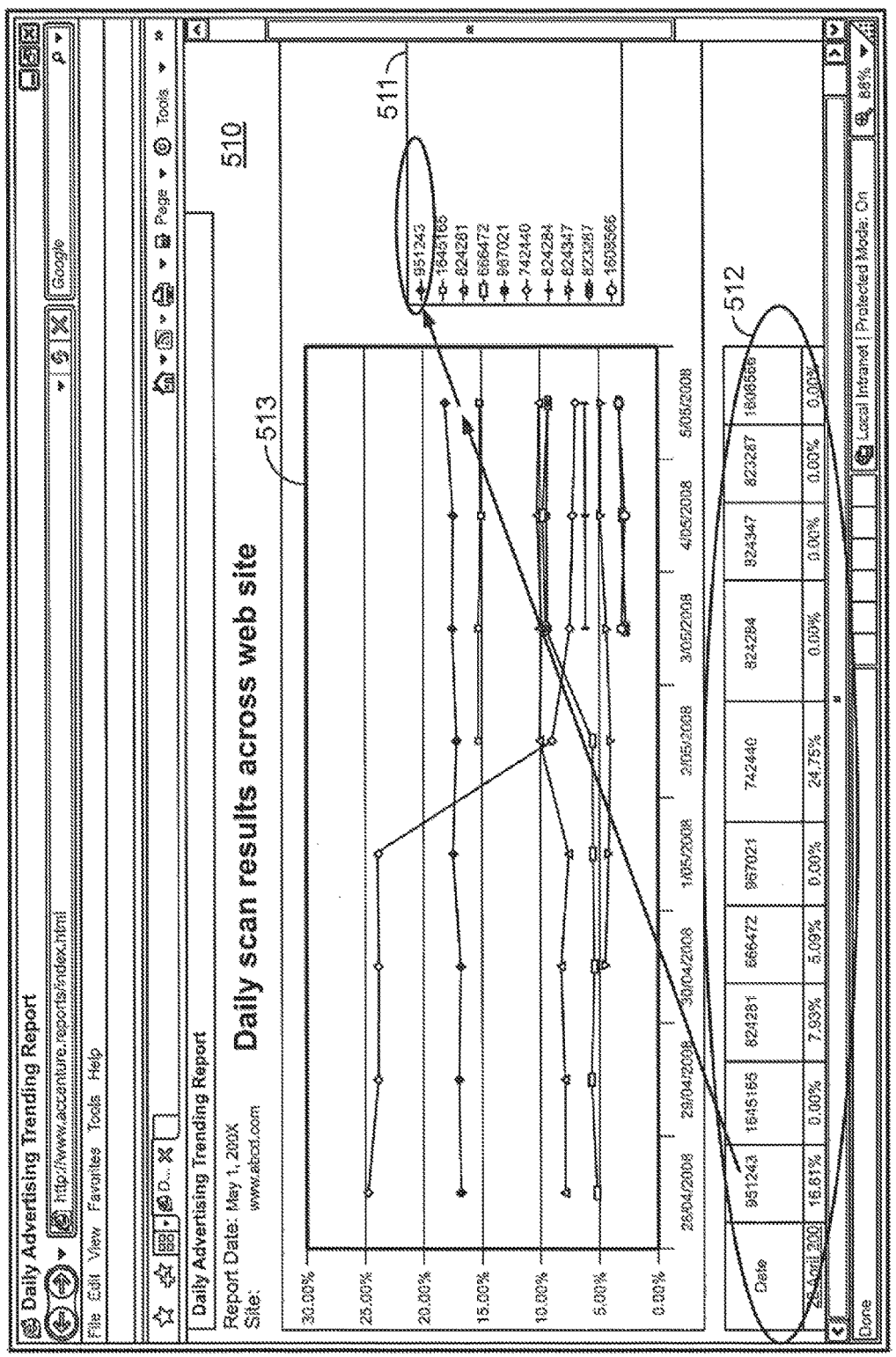

FIGS. 5A-C illustrate sample reports that may be generated by online content evaluation system. FIG. 5A shows a report 500 that provides a snapshot of scan results. The report 500 shows in section 502, the number of pages scanned, the number of images found, the number of images with advertisements and the number of advertisements identified as being client advertisements. The section 503 shows the unique client IDs that may be provided in beacons and are used to identify ads as clients' ads. Each client ID may be selected to view more metrics, such as ad type, page location, etc.

FIG. 5B shows a report 510 illustrating daily scan results for a single web site. The client IDs are shown in section 511. Section 512 shows the percentage of ads on the web site that belong to each client determined from a scan or multiple scans performed on Apr. 28, 2008. Section 513 shows the trend of percentage of ads on the web site that belong to each client over time.

FIG. 5C shows a report 520 illustrating various metrics and KPIs for all campaigns for a particular client. The report shown in FIG. 5A may be provided-as part of an audit service for a client to determine information about their ads that are posted on the Internet. The reports 510 may be part of a benchmarking/competitor analysis, that can be used by a client to compare their ad coverage to coverage of their competitors. The report 520 is a summary report for all the client's campaigns. The metrics and KPIs shown in the report 520 are related to costs, coverage, targeting, attention, and delivery.

Figure 6:
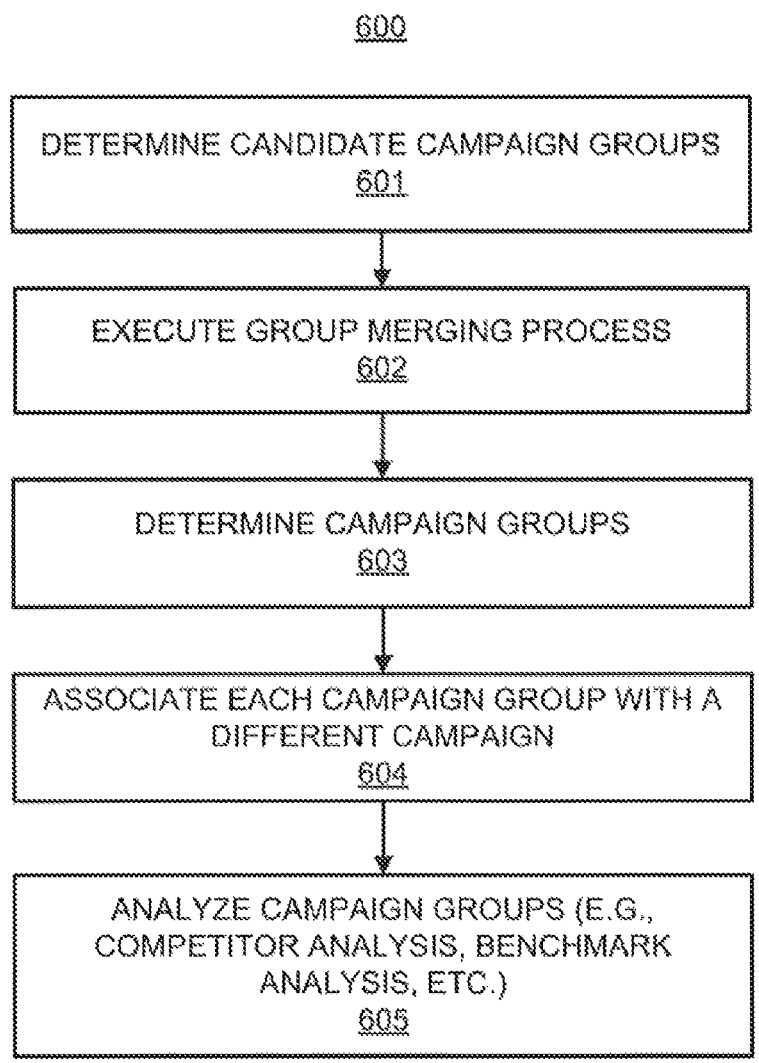
FIG. 6 illustrates a flow chart for classifying online ads, according to an embodiment.

FIG. 6 illustrates a method 600 for classifying online ads, according to an embodiment. The method 600 and methods 700 and 800 described below may be performed by the online content evaluation system 120, including the online content evaluation server 123, shown in FIG. 2.

At step 601, candidate campaign groups of online ads are determined from information, including metrics, captured for the online ads from the scanning of web sites, such as the scanning described with respect to FIGS. 1-4. The groups are candidate campaign groups, and each group comprises online ads estimated to be part of the same campaign.

Online ads included in the same candidate group are estimated to be part of the same ad campaign. Each candidate group may be associated with a different ad campaign. Online ads may be placed in the same candidate group because their metrics are the same or similar. For example, an ad campaign may be characterized by company, brand and product. Online ads determined to have metrics indicating they are for the same company, brand and product are placed in the same candidate group. The metrics may be prioritized to determine which metrics to consider first or to determine which metrics to be given the greatest weight when classifying online ads into candidate groups. In one example, prioritized metrics from highest priority to lowest priority comprise click through URL, filename, time and day online ads were first and last detected, and domain name of web site hosting each online ad. A click through URL is the URL for the landing page when someone clicks on the ad. Other metrics may also be considered. An embodiment of determining candidate groups is described with respect to the method 700 below.

At step 602, a group merging process is executed to merge at least some of the candidate groups. For example, similarities between two candidate campaign groups are determined based on metrics for the online ads in the two candidate campaign groups. A percentage of similarity may be calculated for the two candidate campaign groups based on a comparison of the metrics. The candidate campaign groups may be merged if the similarity percentage is greater than a threshold. Some steps that may be performed for candidate group merging are described in the methods 700 and 800 described below. For example, some steps of the method 700 describe a minimization process that minimizes the number of candidate groups for example when groups are created and the method 800 describes some steps for merging groups, which may include a process for selecting groups for visual comparison.

At step 603, campaign groups are determined from comparisons of candidate campaign groups performed at step 602. Step 603 may include determine campaign groups as a result of campaign group minimization and merging processes.

At step 604, each campaign group is associated with a different ad campaign. For example, the online content evaluation system may present information for different campaigns if known and a user may select a campaign to associate with a campaign group. A different campaign is associated with each campaign group. Also, the campaign groups may be for a company and/or for a company's competitors.

At step 605, analysis may be performed for the campaign groups. The analysis may include cost and competitor analysis 105, benchmark analysis 106, and other analysis and reporting.

Figure 7:
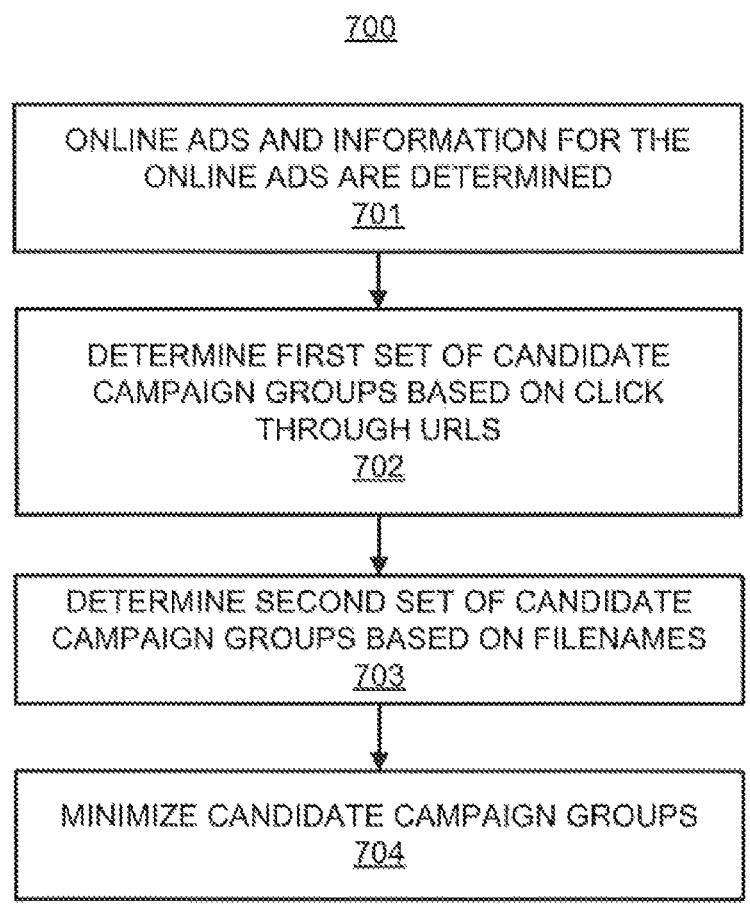
FIG. 7 illustrates a flow chart for determining candidate campaign groups of online ads, according to an embodiment.

FIG. 7 illustrates the method 700 for determining candidate campaign groups of online ads, according to an embodiment. The steps of the method 700 may be performed as sub steps of one or more of the steps of the method 600 described above.

At step 701, online ads and information for the online ads are determined. These may include online ads identified from the scanning of web sites, such as the scanning described with respect to FIGS. 1-4. The information for the online ads may include metrics described above and stored in the database 122. The information for the online ads may include click through URLs, filenames and other metrics described herein, and at least some of the metrics may be determined from the scanning process.

At step 702, a first set of candidate campaign groups are determined based on the click through URLs of the online ads. For example, all online ads having the same click-through URL are placed in the same candidate campaign group. For example, a candidate group is created for the click through URL http://www.example.com/go/display/michelangelo/ and all online ads having this click through URL are placed in the same candidate group. A candidate campaign group may be created for each click-through URL that is different.

At step 703, a second set of candidate campaign groups are determined based on the filenames of the online ads. All online ads with the same or similar filenames are placed into the same candidate campaign group. A candidate campaign group may be created for each sufficiently different filename. At this point, the same online ad may be in multiple candidate campaign groups, such as one candidate campaign group for its click through URL and another for its filename.

When determining whether a filename for an online ad is the same or similar at step 703, portions of the filename may not be considered, so at least some portions of the filename are considered and some portions may not be considered. For example, the filename for the candidate campaign group is Michelangelo %20expandable_300×250_v2.jpg. The filename for the selected online ad is 3452_Michelangelo_Expandable_728×90.swf. The filenames are different but similar. To determine the degree of similarity, various parts of the filename are ignored. These parts may include the width and height of the online ad, an extension (e.g., .jpg or .swf), various delimiters or separator characters (e.g., :, -, %20, _), upper or lower case differences, and version numbers (e.g., v1.2). After ignoring these parts, the filenames to be compared comprise the following: (1) michelangelo expandable, and (2) 3452 michelangelo expandable. Character comparisons, trigrams or other known textual comparison techniques may be used to calculate a degree of similarity between the filenames. Trigram phrase matching is a method of identifying phrases that have a high probability of being synonyms. It is based on representing each phrase by a set of character trigrams that are extracted from that phrase. The character trigrams are used as key terms in a representation of the phrase much as words are used as key terms to represent a document. The similarity of phrases may then be computed using the vector cosine similarity measure. If the degree of similarity is greater than a threshold than the filenames are considered similar. For example, a similarity rating of >74% is considered a match (i.e., similar) and the selected online ad may be added to the candidate campaign group. Assuming the above example gives a similarity rating of 83%, then the online ad is considered similar and may be added to the candidate group. The threshold of 74% is merely an example and other thresholds may be used.

At step 704, the candidate campaign groups are minimized. For example, any candidate campaign groups from the first and/or second sets containing the same online ad are merged. The merging may encompass merging groups based on similarities to a common online ad. For example, online ad 1 may have the same click thru URL as online ad 2, and online ad 2 has a similar click through URL to online ad 3. Online ad 1 and online ad 3 are in the same group after minimizing, but may have neither the same click through URL nor the same/similar filename. Instead, they are grouped because they both having similarities with online ad 2.

As described by way of example in the method 700, the metrics of click through URL and filename are considered for determining whether an online ad is to be included in a candidate group. Other metrics may also be considered. Also, the method 700 is repeated for any online ads waiting to be classified into a candidate campaign group.

Figure 8:
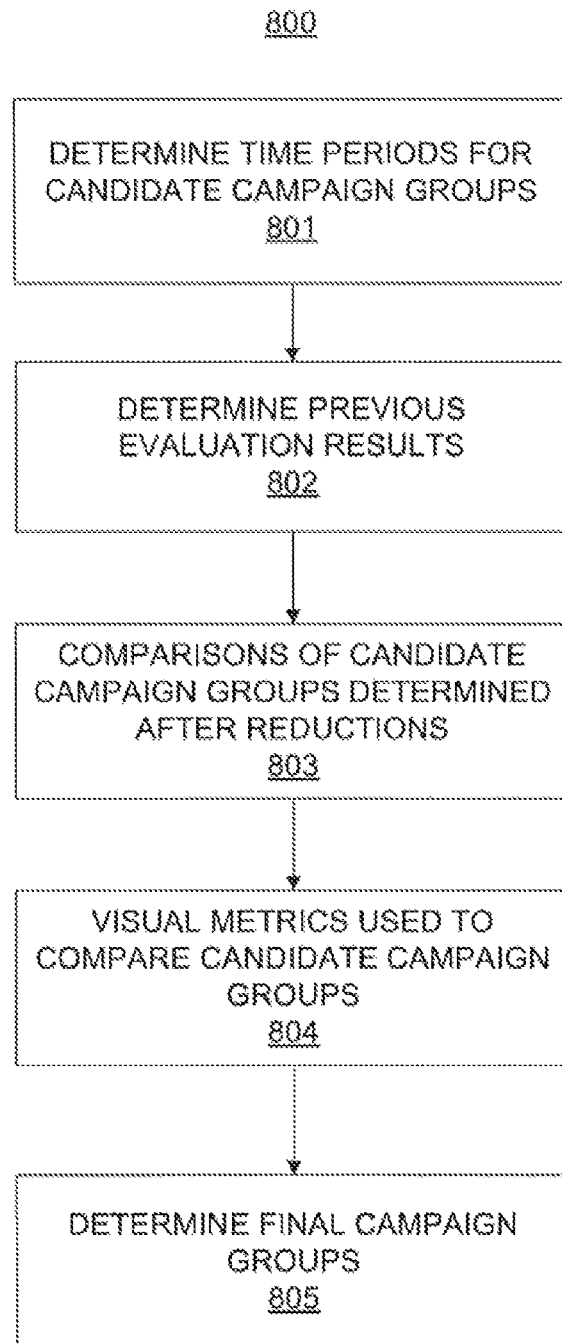
FIG. 8 illustrates a flow chart for executing a merge process, according to an embodiment;.

FIG. 8 illustrates the method B00 for executing the merge process, according to an embodiment. The steps of the method 800 may be performed as sub steps of the step 602 described above.

Some of the candidate campaign groups, may actually belong to the same campaign. Accordingly, a merging process may be executed to identify the candidate campaign groups that are potentially for the same campaign and to merge these candidate campaign groups into a single campaign group. As the number of candidate campaign groups created at step 601 increases, then the number of comparisons that may be performed for the merging process can grow exponentially. Steps 801 and 802 identify criteria that may be used to reduce the number of comparisons.

At step 801, a time period is determined for each candidate campaign group. The time period comprises a period of time from an earliest online ad to a latest online ad in a candidate campaign group. A time metric may be a time and date an online ad was scanned. Scans are performed periodically. Time metrics are determined for all the online ads in the candidate campaign group. An earliest online ad in the candidate campaign group is an online ad with the earliest date and time, for example, from all the periodic scans in a given time range. A latest online ad is an online ad in the candidate campaign group with the latest date and time in the time range.

Candidate campaign groups that do not have overlapping time periods may be considered to be for different campaigns. These candidate campaign groups may not be compared for merging.

Figure 9:
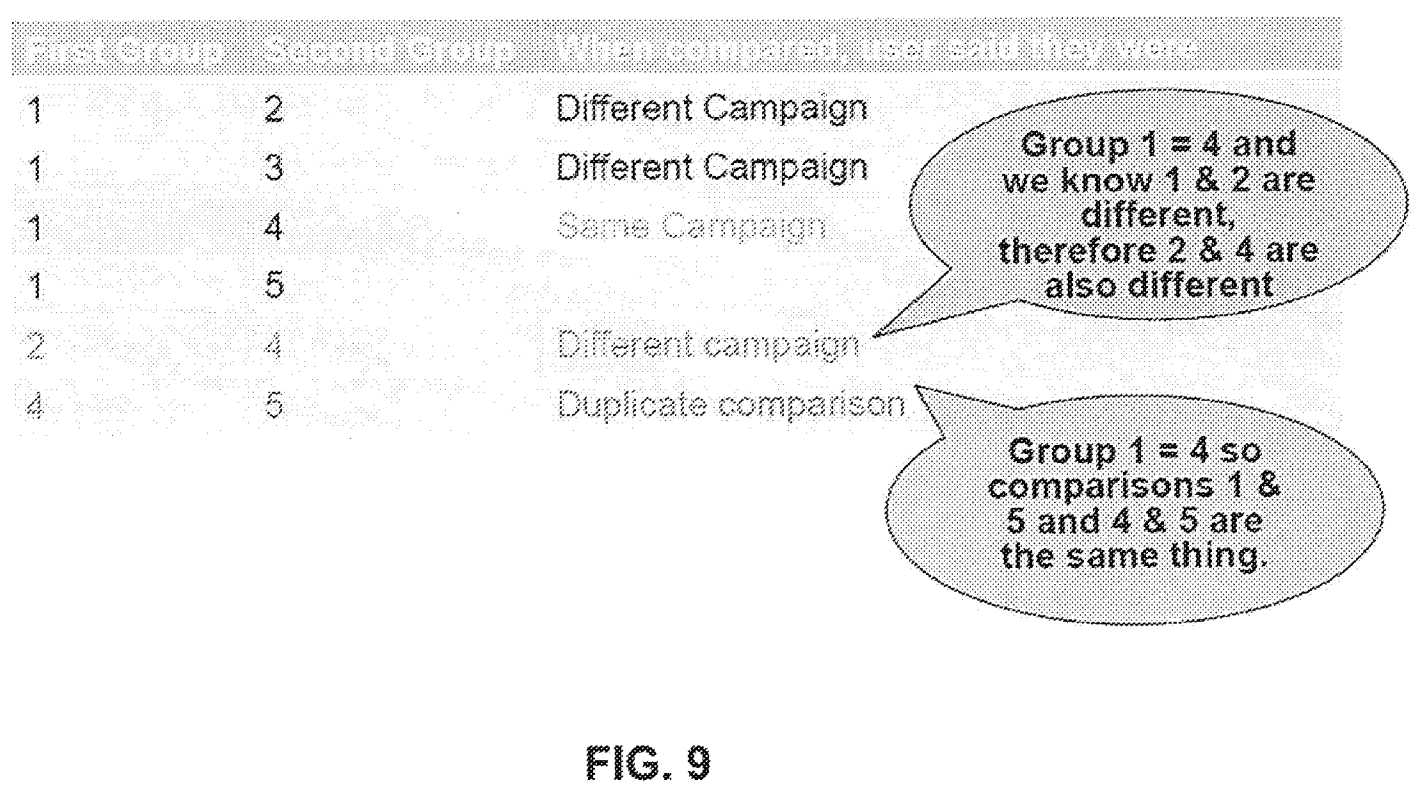

At step 802, previous evaluation results and indications are determined and may be used to exclude candidate campaign groups from future comparisons. For example, FIG. 9 shows a chart indicating some comparisons, in pairs, for candidate campaign groups 1-5. Rows 1-3 show that comparisons were previously performed for the candidate campaign groups identified in each row, and the comparison results are also shown as the following indications: "Different Campaign" or "Same Campaign".

Rows 4-6 represent comparisons that may need to be performed. Row 5 shows that candidate campaign groups may need to be compared. However, the results shown for rows 1-3 indicate that candidate campaign groups 1 and 4 are in the same campaign and that candidate campaign groups 1 and 2 are in different campaigns. Therefore, the online content evaluation system 120 assumes that candidate campaign groups 2 and 4 are in different campaigns. The online content evaluation system 120 also determines that because candidate campaign groups 1 and 4 are in the same campaign, the comparisons to be performed at rows 4 and 6 are considered duplicate comparisons. Therefore, only one of the comparisons of rows 4 and 6 may be performed.

At step 803, comparisons of candidate campaign groups to be performed are determined after reductions are made at steps 801 and 802. For example, as shown in FIG. 9, instead of performing all the comparisons of rows 4-6, only the comparison at row 4 (i.e., comparison of online ads in candidate campaign groups 1 and 5) may be performed based on the determined reductions.

At step 804, for the comparisons of candidate campaign groups to be performed identified at step 803, visual metrics are used to compare the candidate campaign groups. Visual metrics may include text of online ads, color, size, etc. The online content evaluation system 120 may determine the similarity of the visual metrics. Also, a user may be presented with the online ads from the candidate campaign groups being compared for a side-by-side comparison via user interface 124. Based on the visual metrics, a final determination is made as to whether the candidate campaign groups are for the same or different campaigns. The results are stored, for example, in the database 122. The comparison based on visual metrics is repeated for each candidate campaign groups that need to be compared. Non-visual metrics, such as domain name, filename, etc., may also be considered for the comparison. Then, a final set of campaign groups is determined from the comparison. For example, at step 805, candidate campaign groups determined to be part of the same campaign are merged to create a campaign group and candidate campaign groups determined to be part of different campaigns are considered separate campaign groups. The method 800 is repeated for comparisons of other candidate campaign groups.

As discussed above with respect to step 804, the user may be presented with the online ads from candidate campaign groups for a side-by-side comparison via user interface 124. To reduce the number of visual comparisons that are performed, a methodical approach may be used to select which two candidate campaign groups are presented to the user first for the visual comparison review. For example, in order to more quickly reduce the number of remaining comparisons that need to be performed, the process attempts to elicit more "same campaign" answers from the user and not "different campaign" answers in response to the visual comparisons of the online ads. The process to select the candidate campaign groups for comparison prioritizes comparisons, for example, based on similarity of click thru URL, similarity of filename, similarity of time periods and similarity of sites the online ads in each candidate group were seen on. The higher the total similarity rating across these metrics, the earlier the comparison is shown to the user as it has a much higher probability of resulting in a "same campaign" answer. "Same campaign" answers result in excluding future comparisons based on previous evaluation results at step 802.

Figure 10:
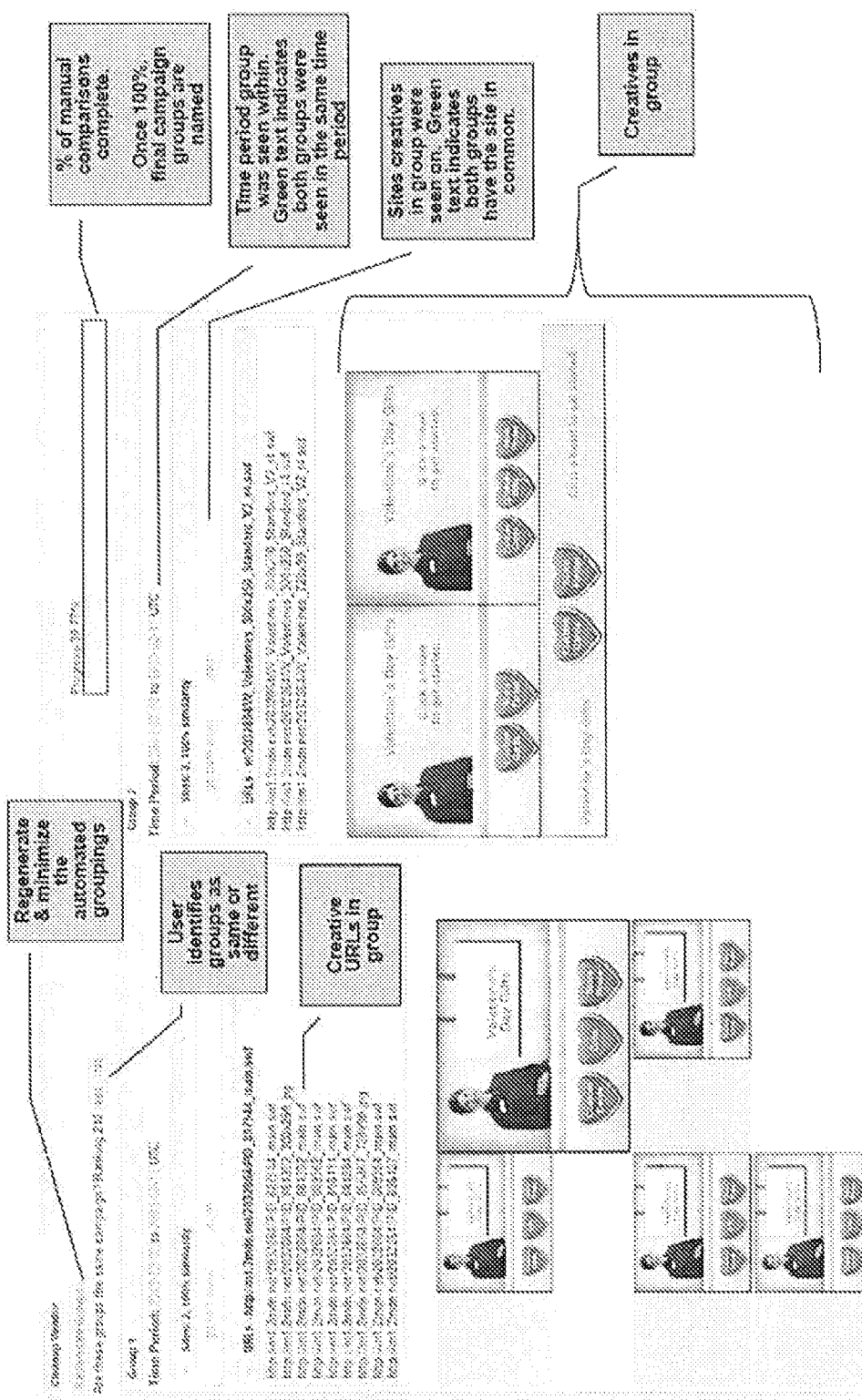
FIG. 10 illustrates an example of a screenshot for comparing candidate campaign groups.
Figure 11:
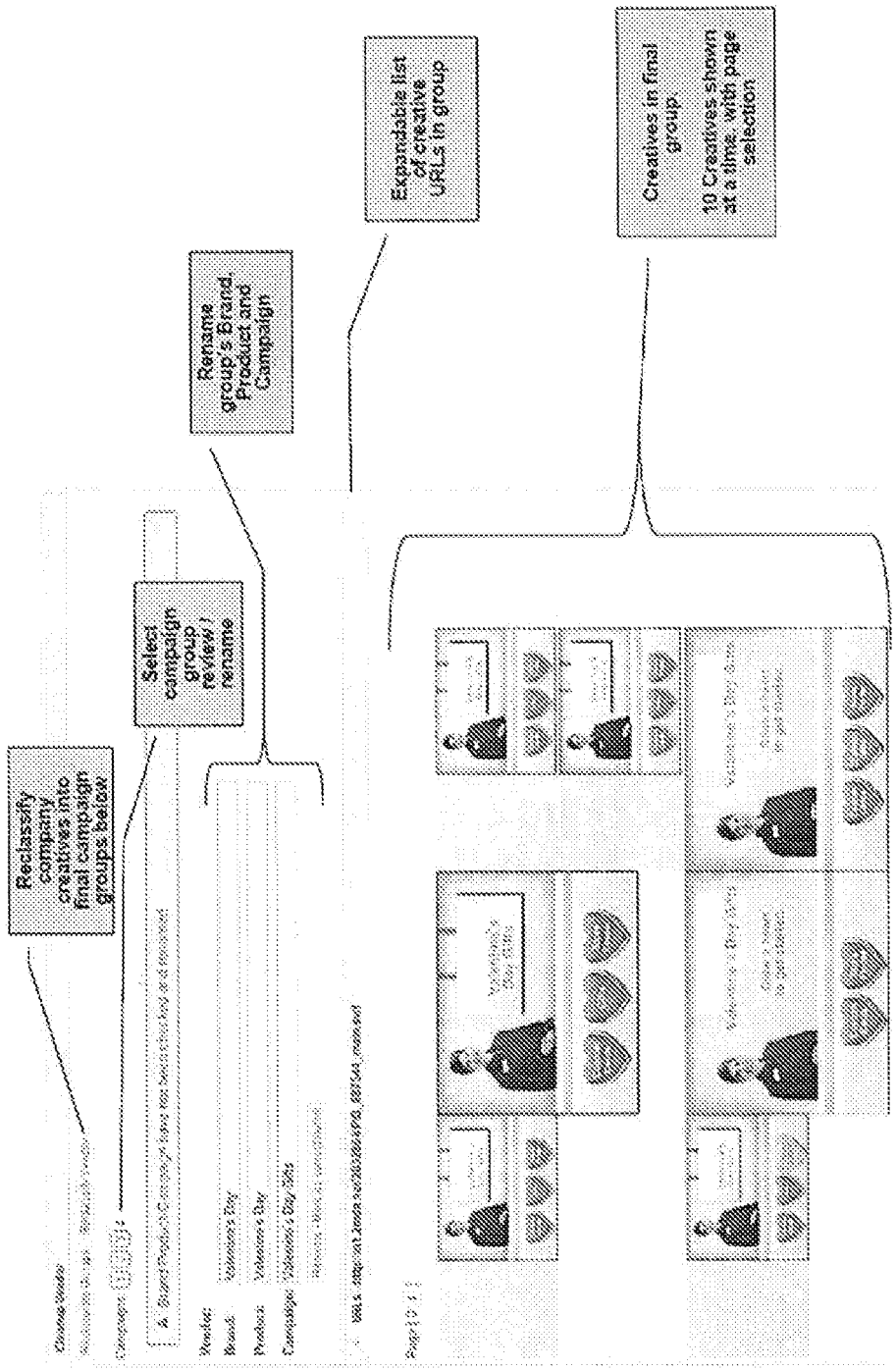
FIG. 11 illustrates an example of a screenshot for assigning a campaign to a campaign group.

FIGS. 10 and 11 show examples of screen shots that may be generated by the online evaluation system 120 in the user interface 124. FIG. 10 shows a screenshot for comparing online ads, for example, at step 804 of the method 800. A user may click the recalculate groups button to have the online evaluation system 120 determine the candidate campaign groups. The online evaluation system 120 and/or a user may use the information shown to determine whether to merge candidate campaign groups. Information for candidate campaign groups 1 and 2 are shown. The information includes the time period for each candidate campaign group. If the time period is the same or overlaps, it may be shown in green or yellow. The domain names of the web sites showing the online ads is also shown. If both candidate campaign groups have a same domain name then it may be shown in green. Filenames are also shown for the online ads in each candidate campaign group. Also, images for the online ads in each candidate campaign group are shown so they can be compared side-by-side. A user may click a button "Yes" or "No" to indicate whether the candidate campaign groups are for the same campaign and should be merged.

FIG. 11 shows a screenshot for assigning a campaign to a campaign group. For example, at step 604, each campaign group is associated with a different ad campaign. This screenshot may be used to assign a company, brand and product of an ad campaign to a campaign group at step 604.

Figure 12:
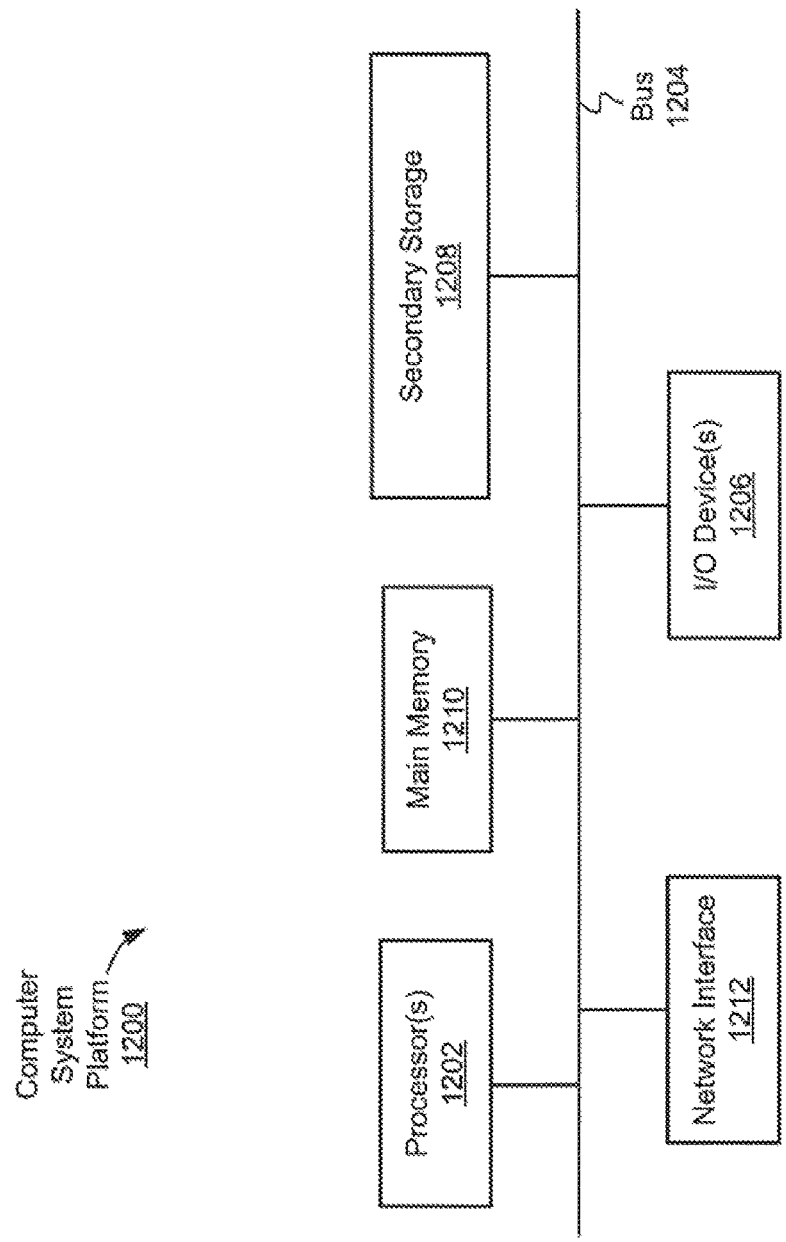
FIG. 12 illustrates a computer system that may be used for the methods and systems, according to an embodiment.

FIG. 12 shows a computer system 1200 that may be used with the embodiments described herein. The computer system 1200 represents a generic platform that includes components that may be in a server or other computer system. The computer system 1200 may be used as a platform for executing one or more of the methods, functions and other steps described herein. These steps may be embodied as software stored on one or more computer readable mediums. Furthermore, the computer system may be a scanning computer system that is a scan server in the scan server cloud 121 shown in FIG. 2. The computer system 1200 may be a computer system performing the functions of online content evaluation system 120 shown in FIG. 2.

The computer system 1200 includes a hardware computer processor 1202 that may implement or execute software instructions performing some or all of the methods, functions, and other steps described herein. Commands and data from the processor 1202 are communicated over a communication bus 1204. The computer system 1200 also includes a main memory 1210, such as a random access memory (RAM), where the software and data for processor 1202 may reside during runtime, and a secondary data storage 1208, which may be non-volatile and stores software and data. The memory and data storage are examples of computer readable mediums.

The computer system 1200 may include one or more I/O devices 1206, such as a keyboard, a mouse, a display, etc. The computer system 1200 may include a network interface 1212 for connecting to a network. It will be apparent to one of ordinary skill in the art that other known electronic components may be added or substituted in the computer system 1200.

One or more of the steps of the methods described herein and other steps described herein and one or more of the components of the systems described herein may be implemented as computer code stored on a non-transitory computer readable medium, such as the memory and/or secondary storage, and executed on a computer system, for example, by a processor, application-specific integrated circuit (ASIC), or other controller. The non-transitory medium may include storage 1208 and/or 1210. The computer code may comprise software performing the functions of the methods and systems described herein. The code may exist as software program(s) comprised of program instructions in source code, object code, executable code or other formats. Examples of computer readable medium include conventional computer system RAM (random access memory), ROM (read only memory), EPROM (erasable, programmable ROM), EEPROM (electrically erasable, programmable ROM), hard drives, and flash memory.

While the embodiments have been described with reference to examples, those skilled in the art will be able to make various modifications to the described embodiments without departing from the scope of the claimed embodiments. For example, the systems and methods are generally described with respect to classifying online ads, however, other online types of online content may be classified into campaigns or other categories according to the embodiments.

What is claimed is:

1. An online content evaluation system comprising:
   a scanning server to scan web sites and to collect metrics for online ads the metrics including coverage, targeting, and delivery metrics, wherein each web site has a hierarchy of web pages starting at a home page, wherein to collect the metrics, the scanning server determines a location of the online ads in the hierarchy of web pages and a location of the online ads in the web pages, and wherein the scanning comprises:
   parsing web pages for the web sites,
   identifying computer code from the parsed web pages, wherein the computer code is a regular image expression or a click thru URL,
   determining whether the computer code includes information identifying the online ads as online ads for a predetermined company, and
   determining values for the metrics for the online ads identified as online ads for the predetermined company;
   data storage storing the values for the metrics for the online ads; and a content evaluation server to classify online ads, wherein to classify the online ads, the content evaluation server:

classifies the online ads into candidate groups based on the metrics and metric values, wherein, for each candidate group, the online ads classified into the candidate group are estimated to be in a same ad campaign;

executes a group merging process to merge at least some of the candidate groups, wherein to execute the group merging process, the content evaluation server:

selects candidate groups for comparison based on a determination that time periods for online ads in the candidate groups overlap, and on indications that the candidate groups are associated with a same campaign;

merges the at least some selected candidate groups based on the metrics, including visual and non-visual metrics for the online ads in the at least some selected candidate groups, wherein the visual metrics include text, color, and size, of each of the online ads and the non-visual metrics include domain name and filename of each of the online ads; and determines campaign groups at least from the merged groups; and assigns an ad campaign to each campaign group.

2. The online content evaluation system of claim 1, wherein to classify the online ads, the content evaluation server:

prioritizes the metrics for the online ads; and classifies the online ads into the candidate groups based on the prioritized metrics, wherein the prioritized metrics from highest priority to lowest priority comprise click through URL, filename, time and day online ads are detected, and domain name of web site hosting each online ad.

3. The online content evaluation system of claim 1, wherein to classify the online ads into candidate groups, the content evaluation server:

determines click through URLs for the online ads from the metrics;

determines filenames for the online ads from the metrics; and assigns online ads having a same click through URL and a same or similar filename into a same candidate group.

4. The online content evaluation system of claim 3, wherein to classify the online ads into candidate groups, the content evaluation server is to:

parse the filenames;

identify portions of the filenames and ignoring other portions of the filenames for comparison; and compare the identified portions of the filenames based upon a vector cosine similarity measure to determine a similarity of the filenames, wherein the filenames having a similarity greater than a threshold are considered similar for determining whether to assign to a same candidate group.

5. An online content evaluation system comprising:

data storage storing online ad information, wherein the online ad information comprises metrics for online ads determined from scanning web sites on the Internet, wherein the metrics include coverage, targeting, and delivery metrics, and wherein the web sites have a hierarchy of web pages starting at a home page; and a processor to:

collect the metrics for the online ads and determine a location of the online ads in the hierarchy of web pages and locations of the online ads in the web pages;

classify the online ads into candidate groups based on the online ad information, wherein, for each candidate group, the online ads classified into the candidate group are estimated to be in a same ad campaign;

execute a group merging process to merge at least some of the candidate groups, wherein to execute the group merging process, the processor:

selects candidate groups for comparison;

determines a time period for each of the selected candidate groups, the time period ranging from an earliest first day to a latest last day online ads in each of the candidate groups were identified from the scanning;

determines whether the time periods for the selected candidate groups overlap;

in response to a determination that the time periods do not overlap, marking the selected candidate groups as not to merge;

in response to a determination that the time periods overlap, merge at least some of the selected candidate groups based on the metrics, including visual and non-visual metrics for the online ads in the selected candidate groups, wherein the visual metrics include text, color, and size, of each of the online ads and the non-visual metrics include domain named filename of each of the online ads; and determine campaign groups at least from the merged groups; and assign an ad campaign to each campaign group.

6. The online content evaluation system of claim 5, wherein to classify the online ads into candidate groups based on the online ad information, the processor prioritizes the metrics for the online ads; and classifies the online ads into candidate groups based on the prioritized metrics.

7. The online content evaluation system of claim 6, wherein the prioritized metrics from highest priority to lowest priority comprise, for each online ad, click through URL of the online ad, filename of the online ad, time the online ad was first detected and last detected on same days, and domain name of web site hosting the online ad.

8. The online content evaluation system of claim 5, wherein to classify the online ads into candidate groups based on the online ad information, the processor determines click through URLs for the online ads from the online ad information;

determines filenames for the online ads from the online ad information; and assigns online ads having a same click through URL and a same or similar filename into a same candidate group.

9. The online content evaluation system of claim 8, wherein to assign the online ads having a same click through URL and a same or similar filename into a same candidate group, the processor parses the filenames;

identifies portions of the filenames and ignoring other portions of the filenames for comparison; and compares the identified portions of the filenames based upon a vector cosine similarity measure to determine a similarity of the filenames based on a threshold.

10. The online content evaluation system of claim 8, wherein to classify the online ads, the processor uses other metrics including an amount of time an online ad was first detected and last detected on same days, and domain name of web site hosting an online ad.

11. The online content evaluation system of claim 5, wherein to select the candidate groups for comparison, the processor
   determines whether a set of candidate groups were previously indicated as being associated with a same campaign; and
   excludes candidate groups in the set from future comparison to other candidate groups based on the previous indications.

12. The online content evaluation system of claim 5, wherein the processor periodically scans the web sites to collect the metrics, wherein to scan the web sites, the processor:
   parses web pages for the web sites,
   identifies ad beacons from the parsed web pages,
   determines whether the ad beacons include information identifying the online ads as online ads for a predetermined company, and
   determines the metrics for the online ads identified as online ads for the predetermined company.

13. The online content evaluation system of claim 12, wherein to scan the web sites, the processor determines whether an identified ad beacon includes a click thru URL, and in response to a determination that the ad beacon includes a click thru URL, the processor follows the click thru URL until a URL is found that does not match an ad beacon, and collects metrics for each click thru URL identified when following the click thru URL.

14. A method of evaluating online content comprising:
   storing online ad information, wherein the online ad information comprises metrics for online ads determined from scanning web sites on the Internet, wherein the metrics include coverage, targeting, and delivery metrics, and wherein the web sites have a hierarchy of web pages starting at a home page;
   classifying, by a computer processor, the online ads into candidate groups based on the online ad information, wherein, for each candidate group, the online ads classified into the candidate group are estimated to be in a same ad campaign;
   executing, by the computer processor, a group merging process to merge at least some of the candidate groups, wherein executing the group merging process comprises:
      selecting candidate groups for comparison;
      determining a time period for each of the selected candidate groups, the time period ranging from an earliest first day to a latest last day online ads in each of the candidate groups were identified from the scanning;
      determining whether the time periods for the selected candidate groups overlap;
      in response to determining that the time periods do not overlap, marking the selected candidate groups as not to merge;
      in response to determining that the time periods overlap, merging at least some of the selected candidate groups based on the metrics, including visual and non-visual metrics for the online ads in the selected candidate groups, wherein the visual metrics include text, color, and size, of each of the online ads and the non-visual metrics include domain name and filename of each of the online ads; and
   determining campaign groups from at least the merged groups; and
   assigning an ad campaign to each group in the set of groups.

15. The method of claim 14, wherein classifying the online ads into candidate groups based on the online ad information comprises:
   prioritizing the metrics for the online ads; and
   classifying the online ads into candidate groups based on the prioritized metrics.

16. The method of claim 15, wherein the prioritized metrics from highest priority to lowest priority comprise, for each online ad, click through URL of the online ad, the filename of the online ad, time the online ad was first detected and last detected on same days, and the domain name of web site hosting the online ad.

17. The method of claim 14, wherein classifying the online ads into candidate groups comprises:
   determining click through URLs for the online ads from the online ad information;
   determining the filenames for the online ads from the online ad information; and
   assigning online ads having a same click through URL and a same or similar filename into a same candidate group.

18. A non-transitory computer readable medium including computer code that when executed by a computer causes the computer to:
   store online ad information, wherein the online ad information comprises metrics for online ads determined from scanning web sites on the Internet, wherein the metrics include coverage, targeting, and delivery metrics, and wherein the web sites have a hierarchy of web pages starting at a home page;
   classify the online ads into candidate groups based on the online ad information, wherein, for each candidate group, the online ads classified into the candidate group are estimated to be in a same ad campaign;
   execute a group merging process to merge at least some of the candidate groups, wherein to execute the group merging process, the instructions are to cause the computer to:
      select candidate groups for comparison;
      determine a time period for each of the selected candidate groups, the time period ranging from an earliest first day to a latest last day online ads in each of the candidate groups were identified from the scanning;
      determine whether the time periods for the selected candidate groups overlap;
      in response to a determination that the time periods do not overlap, mark the selected candidate groups as not to merge;
      in response to a determination that the time periods overlap, merging at least some of the selected candidate groups based on the metrics, including visual and non-visual metrics for the online ads in the selected candidate groups, wherein the visual metrics include text, color, and size, of each of the online ads and the non-visual metrics include domain name and filename of each of the online ads; and determine campaign groups from at least the merged groups; and assign an ad campaign to each campaign group.

\* \* \* \* \*